T. T. McKAIG.
TRACTOR.
APPLICATION FILED DEC. 23, 1911.
1,130,314.
Patented Mar. 2, 1915.
5 SHEETS—SHEET 1.
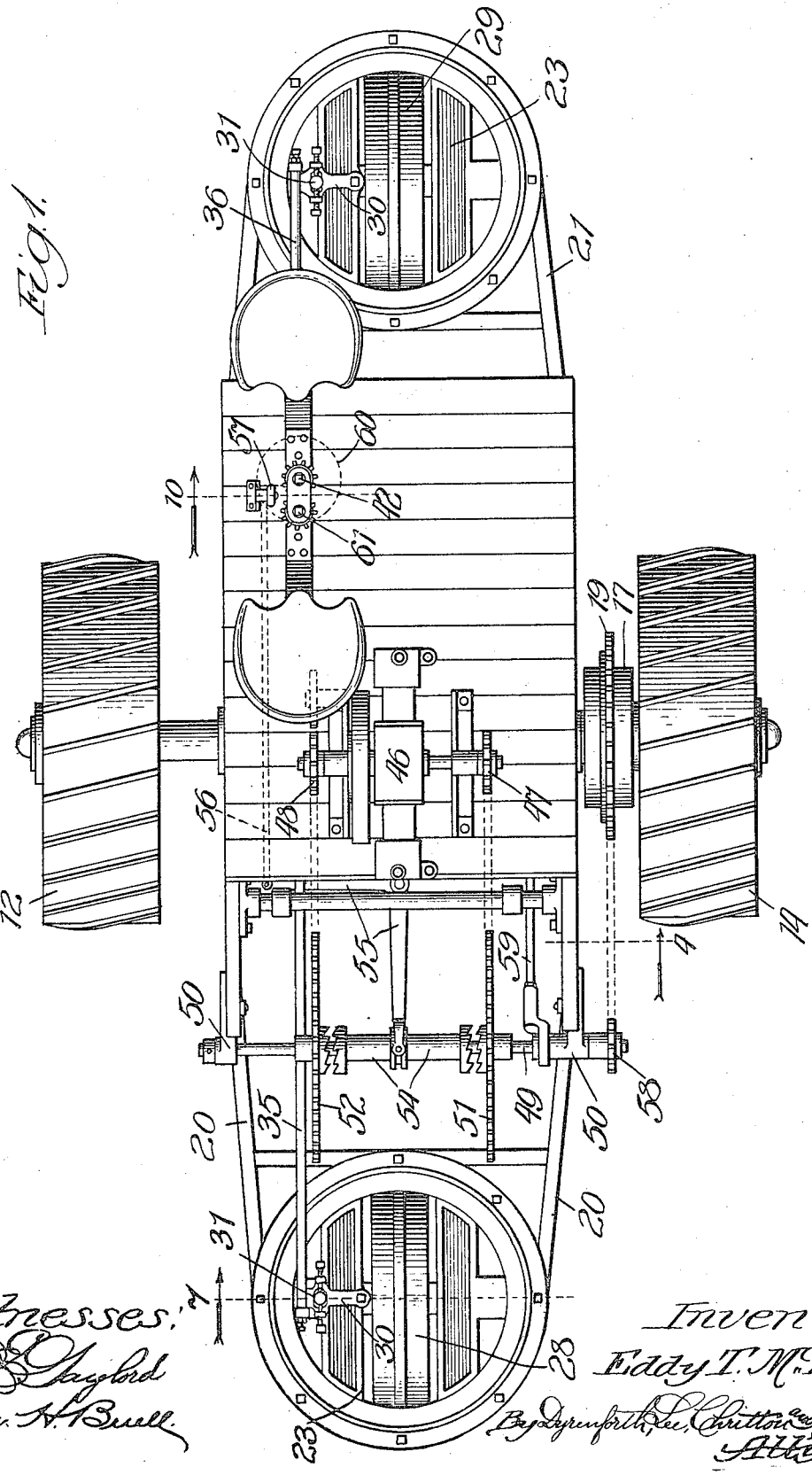

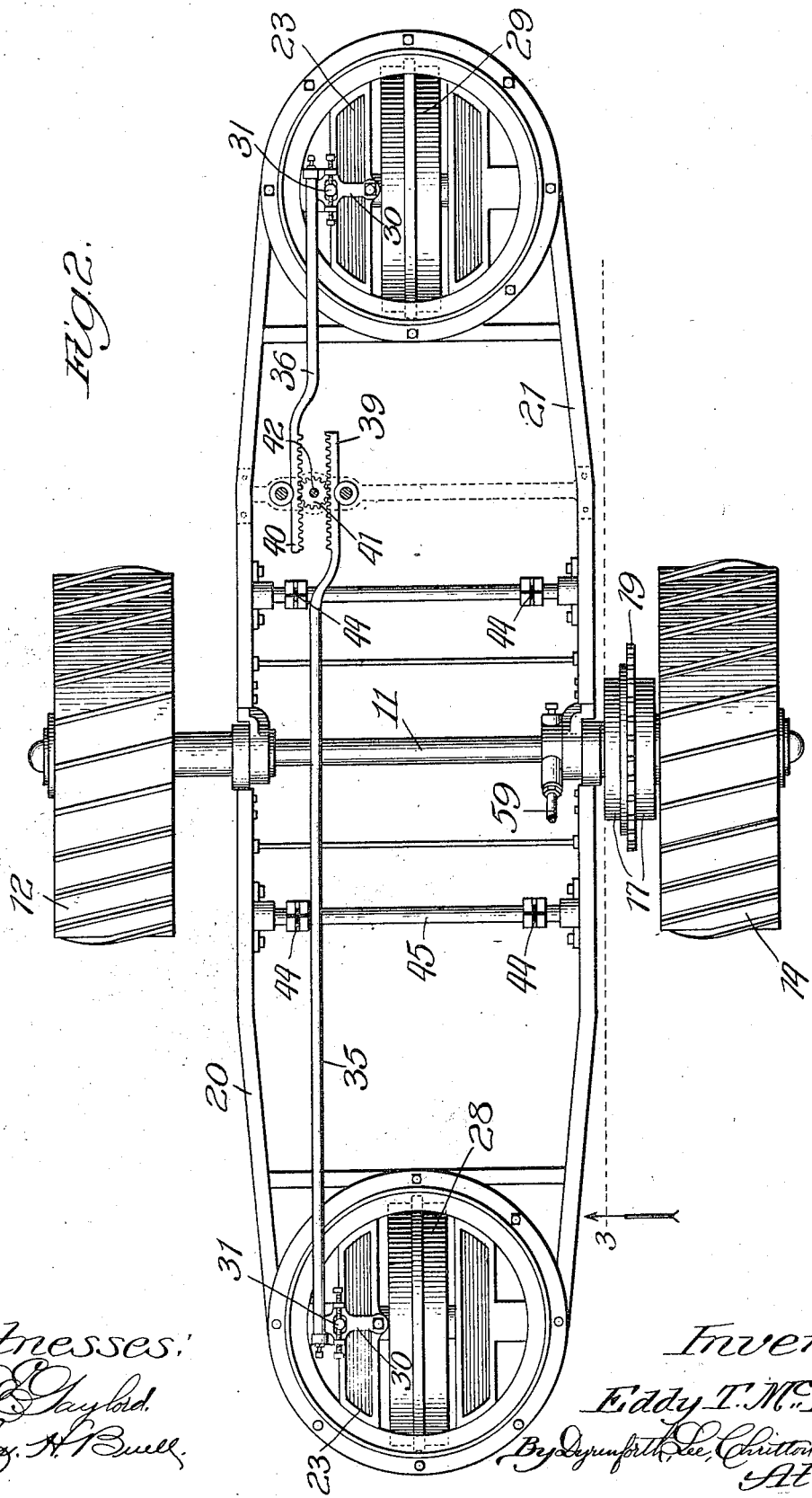

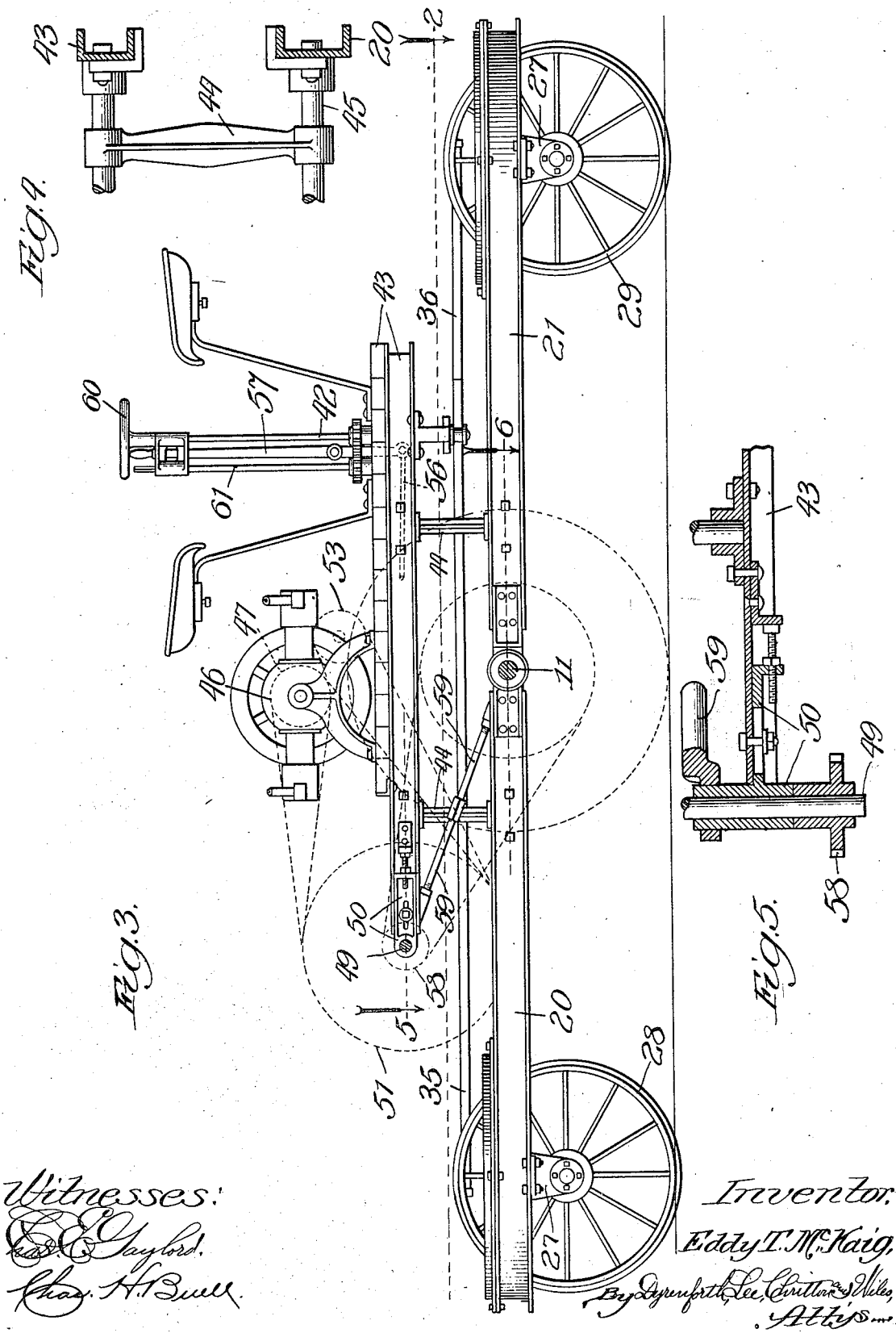

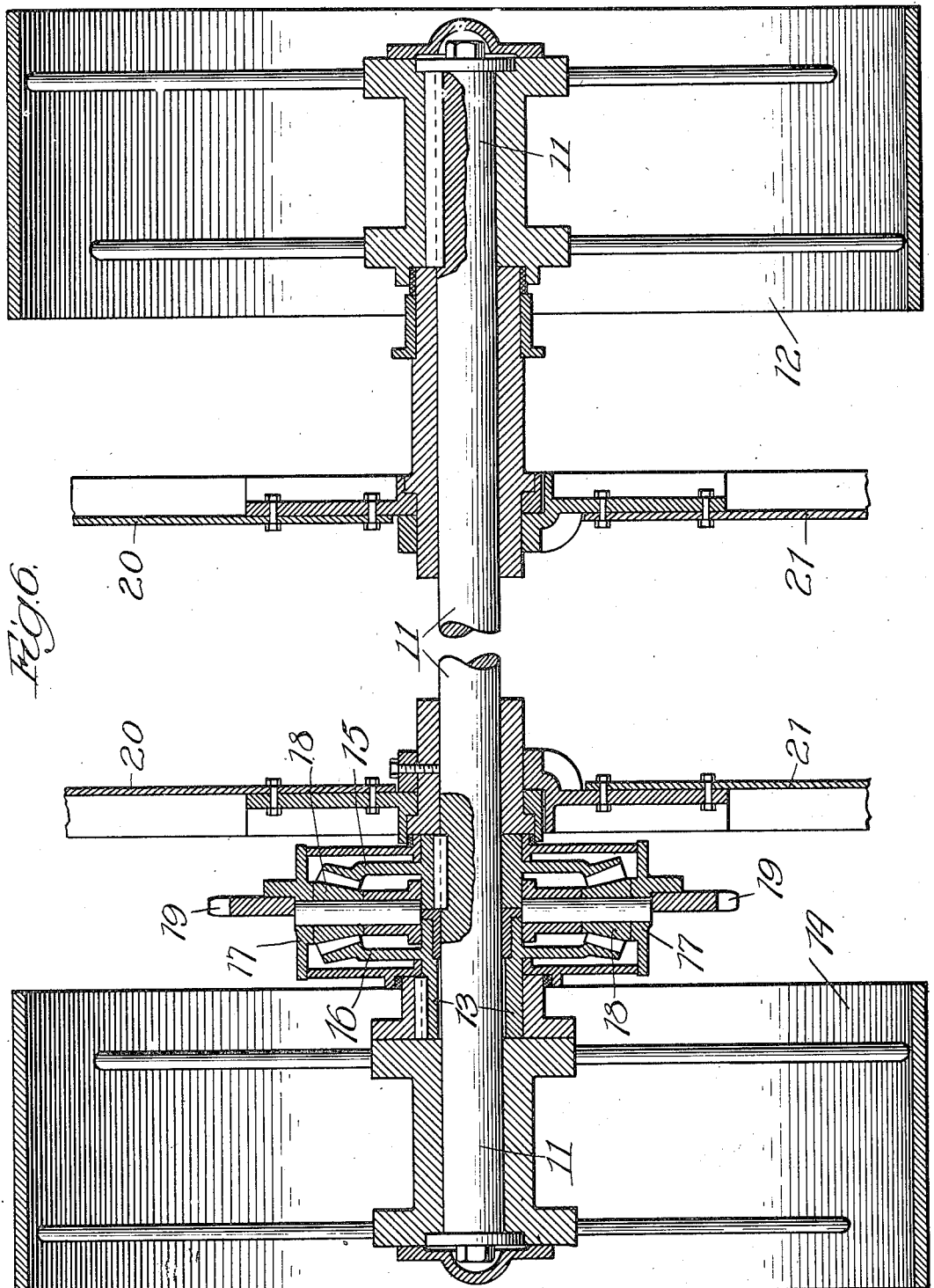

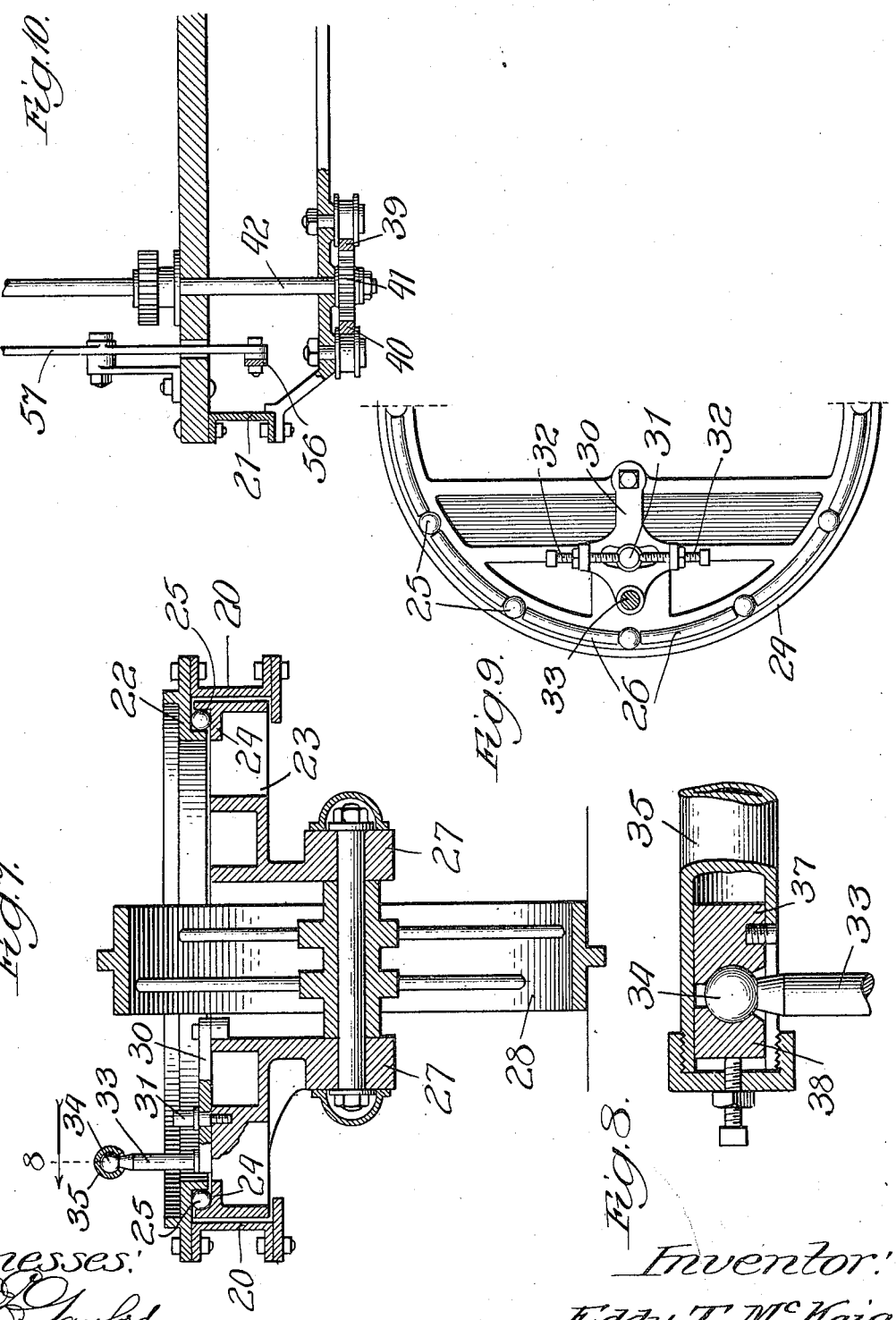

UNITED STATES PATENT OFFICE.

EDDY T. McKAIG, OF CHICAGO, ILLINOIS, ASSIGNOR OF ONE-HALF TO H. G. HASCALL, OF CHICAGO, ILLINOIS.

TRACTOR.

1,130,314. Specification of Letters Patent. Patented Mar. 2, 1915.

Application filed December 23, 1911. Serial No. 667,441.

*To all whom it may concern:*

Be it known that I, EDDY T. McKAIG, a citizen of the United States, residing at Chicago, in the county of Cook and State of Illinois, have invented a new and useful Improvement in Tractors, of which the following is a specification.

My invention relates to certain new and useful improvements in tractors, and is fully described and explained in the specification and shown in the accompanying drawings, in which—

Figure 1 is a top plan of my improved device; Fig. 2 is a horizontal section on the line 2 of Fig. 3; Fig. 3 is a vertical section on the line 3 of Fig. 2; Fig. 4 is a vertical transverse section on the line 4 of Fig. 1; Fig. 5 is a horizontal section on the line 5 of Fig. 3; Fig. 6 is a horizontal transverse section on the line 6 of Fig. 3, the central portion of the structure being broken away; Fig. 7 is a vertical section on the line 7 of Fig. 1; Fig. 8 is a section on the line 8 of Fig. 7; Fig. 9 is a top plan of the lower ring of the ball-race of Fig. 7, and Fig. 10 is a vertical transverse section on the line 10 of Fig. 1.

Referring to the drawings, 11 is the main shaft running through the tractor from side to side. Keyed to one end of this shaft is a driving-wheel 12. Upon the opposite end of the shaft is a sleeve 13 which is secured to another driving-wheel 14.

15 and 16 are the two extreme pinions of a differential gear, and they are respectively secured to the shaft 11 and sleeve 13.

17 is the intermediate pinion-carrying member of the differential gear, the same carrying the intermediate pinions 18 in mesh with the pinions 15 and 16, carrying on its periphery a sprocket-wheel 19 through the medium of which power may be applied to the shaft and sleeve in an obvious manner.

20 and 21 are frame members, each formed of a bar of outwardly-facing channel iron bent into a U-shaped form, and each pivotally secured at its ends to the shaft 11. Each frame member carries at its upper end an upper race 22 (Fig. 7). Beneath this race is a turntable 23 formed with a lower ball-race 24 (Figs. 7 and 9). Between the upper and lower ball-races are a series of antifriction balls 25, held by ball-retainers 26. The turntable 23 has downwardly extending brackets 27 which support a steering wheel 28, it being understood that there is a turntable and steering wheel at each end of the tractor, the one supported by the frame-member 21 being indicated by the character 29 in the drawings. Each turntable is slotted diametrically to permit the upper part of the steering wheel to extend through it, as illustrated. Secured to each turntable, at one side of the corresponding steering wheel, is a pivoted plate 30 slotted for the passage of a stud 31 mounted upon the turntable. Each pivoted plate 30 also carries two adjusting screws 32 which engage with the corresponding stud 31, for the purpose of moving the pivoted plate and fixing it firmly in position. At the end of each pivoted plate 30 is an upwardly extending rod, that on the turntable at the left in the drawings being indicated by 33, and the other not appearing in the drawings because concealed by other parts of views chosen. The upper end of the rod 33 carries a ball 34. Steering rods 35 and 36 run to these two vertical rods on the turntable, as shown in Fig. 2. Each steering rod is slotted at its lower side toward the end and is made hollow to receive the ball, as shown in Fig. 8, bearing blocks 37 and 38, the latter adjustable as shown in Fig. 8, being provided. The steering rods 35 and 36 terminate at their adjacent ends in overlapping racks 39 and 40 in mesh with the opposite sides of a pinion 41 carried by a steering shaft 42. Thus, by rotating the steering shaft in either direction the two steering wheels will be turned oppositely, so as to follow the same general curve.

43 is a platform connected by links 44 with shafts 45 in the frame-members 20 and 21. This construction is manifestly such that as long as the frame-members lie in the same plane, the platform is free to move parallel therewith, but when either framemember 20 or 21 is moved upward with reference to the other, the platform will correspondingly oscillate. Upon the platform is mounted a gas-engine 46, the shaft of which has on its ends sprockets 47 and 48. 49 is a shaft journaled in adjustable brackets 50 at one end of the platform, the adjusting mechanism being shown in Fig. 5. 51 and 52 are sprockets loose on the shaft 49. The sprocket 51 is connected with the sprocket 47 on the gas-engine shaft to rotate in the same direction therewith. The sprocket 52 engages a chain which runs over an idler 53 and under and in engagement with the sprocket 48 on the gas-engine shaft, so that the sprocket 52 rotates in the reverse direction from the engine. The sprockets 51 and 52 are provided with clutch-members and a collar 54 is keyed to the shaft 49 and movable into engagement with either of the clutch-members upon the sprockets 51 and 52, so as to drive the shaft 49 in either direction. The collar 54 can be shifted through a bell-crank lever 55 connected by a link 56 to a hand-lever 57 pivoted upon the platform.

The shaft 49 carries at its end a sprocket 58 which is chain connected to the sprocket 19 on the differential gear. A radius rod 59 connects the shaft 49 and the main-driving wheel-shaft 11, this radius rod being of adjustable length.

The chains connecting the sprockets 51 and 52 with the engine are adjusted to proper tension by moving the shaft 49 through the medium of its adjustable journals. The chain connecting the sprockets 58 and 19 is adjustable to proper tension by adjusting the length of the radius rod 59. This radius rod serves the additional purpose of holding the platform in a relatively stable position.

The platform carries two seats for the operator, one facing in each direction, as illustrated, and the steering shaft 42 extends upward between the same. This shaft is adapted to receive a steering wheel 60. Adjacent to the steering shaft 42 is a supplemental steering shaft 61 geared to rotate in the reverse direction. The steering wheel 59 can be removed from the shaft 42 and put on the supplemental steering shaft. By this means, whichever way the operator may be facing, the steering wheel can be so located as to turn the vehicle in the direction in which it is turned.

The present tractor is designed especially to be incorporated in a motor-plow, such as that illustrated in my application filed February 1st, 1911, Serial No. 605,922, in which application it has been required that the claims to the tractor be divided out. The present tractor is the device of that application as far as the general principles are concerned. It embodies, however, certain details of construction and minor variations which are not illustrated in that application and which may be patentable of themselves.

While this tractor may be used for other purposes than plowing, its especial advantages most strongly appear in that use. In plowing it is especially desirable to have a tractor which can run readily in both directions, so that two separate plows can be attached to it, one facing in each direction. It is necessary for the tractor to run on much rough ground, and a triangular support is best suited for that purpose. Also, it is well known that it is better to drive any device of this character with two wheels, and to do this in a tricycle construction necessitates the use of two driving wheels in transverse line and a single wheel to the front or rear. A three-wheel construction of this character is unsymmetrical; in traveling one direction or the other the driving wheels must move forward, and in traveling in one direction against a heavy pull, it may be unstable. The present tractor is in substance a double tricycle. That is, it has a central pair of driving wheels in transverse line with each other and a steering wheel at each end pivotally supported with reference to each other and with reference to the driving wheels, so that in traveling in one direction the driving wheels and whichever steering wheel happens to be in front form an operative tricycle, the other steering wheel is, or may be, under certain conditions entirely idle. The combination with this double tricycle arrangement of the platform hung on links is peculiarly desirable, because of the fact that the movement of the frame-members is not entirely transmitted to the platform and because of the convenient means of adjustment of the driving or power transmitting mechanism which this arrangement affords.

I am aware that considerable variation is possible in the details of the construction as thus shown and described, and therefore I do not intend to limit myself to the details set forth, except as pointed out in the following claims in which it is my intention to claim all the novelty inherent in the structure described, as broadly as will be permitted by the state of the art.

What I claim as new and desire to secure by Letters Patent is—

1. In a device of the class described, a pair of U-shaped frames having pivotal collars at their ends, a shaft passing through said collars, lateral drive wheels mounted on the ends of said shaft, and a single pilot wheel mounted in the closed end of each of the frames in line with each other and in a line intermediate the drive wheels.

2. In a device of the character described, a pair of U-shaped frames having pivotal collars at their ends, the collars on the ends of one of said frames being offset with relation to the collars on the ends of the other frame whereby to cause said frames to extend in longitudinal alinement, a shaft passing through said collars, lateral drive wheels mounted on the ends of said shaft, and a single pilot wheel mounted in the closed end of each of the frames in line with each other and in a line intermediate the drive wheels.

3. In combination a driving-shaft and driving-wheels, frame-members pivoted thereto and extending forward and back, pilot wheels at the ends of the frame-members, a platform, links connecting the platform to the frame-members and an adjustable radius rod connecting the drive-shaft and the platform.

4. In combination a driving-shaft and driving-wheels, frame-members pivoted thereto and extending forward and back, pilot wheels at the ends of the frame-members, a platform, links connecting the platform to the frame-members, an adjustable radius rod connecting the drive-shaft and the platform, and power-transmitting sprocket-wheels on the drive-shaft and platform, that on the platform being central with respect to the corresponding end of the radius rod.

5. In combination, a drive-shaft, driving-wheels, frame-members pivoted to the driving-shaft, pilot wheels at the ends of the frame-members, a platform, links connecting the platform to the frame-members, an engine on the platform, a shaft on the platform, means for driving the shaft from the engine, a sprocket connection between the shaft and the drive-shaft and a radius rod adjustable in length connecting the shaft and the drive-shaft.

6. In combination, a driving-shaft, driving-whels thereon, frame-members pivotally supported on the driving-shaft, pilot wheels carried by the ends of the frame-members, a platform, links connecting the platform to the frame-members, an engine on the platform, a shaft adjustable on the platform, sprocket and clutch-means connecting the engine and shaft on the platform to drive said shaft in either direction without reversing the engine, a sprocket connection between the shaft on the platform and the driving-shaft, and an adjustable radius rod connecting the shaft on the platform and the driving-shaft.

In testimony whereof I have hereunto set my hand this 13th day of December, 1911.

EDDY T. McKAIG.

In the presence of two subscribing witnesses:
R. A. RAYMOND,
R. A. SCHAEFER.